United States Patent Office.

JOHN L. REESE, OF BALTIMORE, MARYLAND.

PROCESS OF PRESERVING MEATS.

SPECIFICATION forming part of Letters Patent No. 237,905, dated February 15, 1881.

Application filed December 4, 1880. (No specimens.)

*To all whom it may concern:*

Be it known that I, JOHN L. REESE, a citizen of the United States, resident at Baltimore, in the county of Baltimore and State of Maryland, have invented certain new and useful Improvements in Processes for Packing Meats; and I do hereby declare the following to be a full, clear, and exact description of the invention, such as will enable others skilled in the art to which it appertains to make and use the same.

This invention relates to processes for preserving meats when packed.

The invention consists in preparing grease, such as tallow and lard, with sulphurous gas, and then packing meat in a receptacle with such prepared grease poured in, layer for layer, all as hereinafter described.

In carrying out this process the meat to be packed is cut up into convenient and suitable sized pieces. The fat or grease most suitable as an envelope for such meat, tallow, lard, or any other that may be determined on is then to be prepared with the gas. The fat is to be cut up into strips and placed within an air-tight chamber and subjected to the fumes of the gas. After it is fully impregnated it is to be removed and then tried out, and in its melted state it is ready to be used; or the fat may be first rendered, and when in a liquid condition be placed in an air-tight chamber, and the fumes of gas be pumped into it until the liquid fat is fully impregnated therewith; or if the rendered fat is cold and hard, it can be broken up into small pieces, and be placed upon shelves within the chamber, and be subjected to the gas. The essentiality of this step being that the fat shall be subjected to sulphurous gas, the precise method may be varied.
This prepared fat, while in a melted condition, is to be poured into the receptacle, box, barrel, cask, &c., until a layer is formed at the bottom. A layer of meat is then placed in, and more melted fat poured on, filling the interstices of the meat and forming a covering around the meat next the receptacle and a layer above. More meat is placed in and more fat, and this is continued until the receptacle is filled, the fat being poured on for the last layer. The meat is thus packed away, each piece being completely surrounded by the prepared fat, which keeps the pieces from touching, prevents heat, and consequent decay. The antiseptic in the fat prevents the same from becoming rancid and effecting the meat, and at the same time the meat has all the benefits of the preserving qualities of the antiseptic without being directly processed itself.

What I claim is—

In packing raw meat, the process for preserving the same which consists, first, in putting the fat of the meat into an air-tight chamber and charging it with sulphurous gas; second, pouring the fat thus charged into the packing-case until a layer is formed; third, putting in a layer of raw meat without the pieces touching one another; fourth, pouring in more of the charged fat until all the interstices among and around the meat are filled and the latter is covered; and, fifth, continuing the operation until the case is filled, the charged fat forming the top layer, whereby the fat is kept pure and the meat preserved without being affected by the gas, all substantially as described.

In testimony whereof I affix my signature in presence of two witnesses.

JOHN L. REESE.

Witnesses:
NICHOLAS W. WATKINS,
OTTO BENNER, Jr.